(12) United States Patent
Shapin et al.

(10) Patent No.: US 11,071,126 B2
(45) Date of Patent: Jul. 20, 2021

(54) CODE BLOCK AWARE SLOT PREEMPTION

(71) Applicant: Telefonaktiebolaget LM Ericsson (publ), Stockholm (SE)

(72) Inventors: Alexey Shapin, Luleå (SE); Yufei Blankenship, Kildeer, IL (US); Caner Kilinc, Luleå (SE); Stefan Parkvall, Bromma (SE); Sara Sandberg, Luleå (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 44 days.

(21) Appl. No.: 16/616,747

(22) PCT Filed: May 14, 2018

(86) PCT No.: PCT/SE2018/050496
§ 371 (c)(1),
(2) Date: Nov. 25, 2019

(87) PCT Pub. No.: WO2018/222104
PCT Pub. Date: Dec. 6, 2018

(65) Prior Publication Data
US 2021/0127407 A1  Apr. 29, 2021

Related U.S. Application Data

(60) Provisional application No. 62/512,200, filed on May 30, 2017.

(51) Int. Cl.
*H04W 72/12* (2009.01)
*H04L 1/18* (2006.01)
(Continued)

(52) U.S. Cl.
CPC ...... *H04W 72/1242* (2013.01); *H04B 7/0413* (2013.01); *H04L 1/0068* (2013.01); *H04L 1/1854* (2013.01); *H04L 47/245* (2013.01)

(58) Field of Classification Search
CPC ............ H04W 72/1242; H04L 1/1854; H04L 47/245; H04L 1/0068; H04B 7/0413
See application file for complete search history.

(56) References Cited

U.S. PATENT DOCUMENTS

2016/0270045 A1* 9/2016 Mukkavilli ........... H04L 5/0048

FOREIGN PATENT DOCUMENTS

WO  WO-2017010477 A1 * 1/2017 ........ H04W 72/1268
WO  2017 056003 A2    4/2017
(Continued)

OTHER PUBLICATIONS

3GPP TSG-RAN WG1 #89, R1-1707412, Hangzhou, P.R. China, May 15-19, 2017, Source: Intel Corporation, Title: On CBG-based HARQ-ACK feedback (Year: 2017).*
(Continued)

*Primary Examiner* — Brenda H Pham
(74) *Attorney, Agent, or Firm* — Baker Botts, LLP

(57) ABSTRACT

According to certain embodiments a method is provided for use in a wireless transmitter that includes receiving an indication to schedule a high-priority transmission to preempt a lower-priority transmission that comprises one or more code blocks. A first resource allocation is determined for the high-priority transmission. A fraction of bits in the one or more code blocks of the lower-priority transmission that will be punctured by the first resource allocation is determined. When the fraction of bits in the one or more code blocks of the lower-priority transmission that will be punctured is less than a threshold, the first resource allocation is used for the high-priority transmission. Otherwise, a second allocation for the high-priority transmission is determined and used to minimize a number of the one or more code blocks that will be punctured.

24 Claims, 10 Drawing Sheets

(51) Int. Cl.
*H04B 7/0413* (2017.01)
*H04L 12/851* (2013.01)
*H04L 1/00* (2006.01)

(56) References Cited

FOREIGN PATENT DOCUMENTS

| WO | WO-2017056003 A2 * | 4/2017 | .......... H04L 1/1896 |
| WO | 2017 010477 A1 | 5/2018 | |

OTHER PUBLICATIONS

3GPP TSG-RAN WG1 #89 R1-1707413, Hangzhou, P.R. China, May 15-19, 2017, Source: Intel Corporation, Tittle: Scheduling of CBG-based transmissions (Year: 2017).*

3GPP TSG-RAN WG1 #89; Hangzhou, P.R. China; Source: Intel Corporation; Title: On CBG-based HARQ-ACK feedback (R1-1707412)—May 15-19, 2017.

3GPP TSG-RAN WG1 #89; Hangzhou, P.R. China; Source: Intel Corporation; Title: Scheduling of CBG-based transmissions (R1-1707413)—May 15-19, 2017.

3GPP TSG RAN WG1 Meeting #89; Hangzhou, China; Source: ZTE; Title: [88b-13] Summary Email discussion on: "CBG based retransmission, Transmission/retransmission of preempted data before/after ACK NACK feedback, Preemption indication for NR" (R1-1709148)—May 15-19, 2017.

3GPP TSG-RAN WG2 NR Ad Hoc; Spokane, USA; Source: Ericsson; Title: Overview of URLLC (Tdoc R2-1700393)—Jan. 17-19, 2017.

3GPP TSG-RAN WG1 Meeting #89; Hangzhou, China; Source: Ericsson; Title: On Frequency-domain and Time-domain Resource Allocation (R1-1709095)—May 15-19, 2017.

PCT International Search Report for International application No. PCT/SE2018/050496—dated Oct. 1, 2018.

PCT Written Opinion of the International Searching Authority for International application No. PCT/SE2018/050496—dated Oct. 1, 2018.

* cited by examiner

CODE BLOCK AWARE SLOT PREEMPTION

PRIORITY

This nonprovisional application is a U.S. National Stage Filing under 35 U.S.C. § 371 of International Patent Application Serial No. PCT/SE2018/050496 filed May 14, 2018 and entitled "CODE BLOCK AWARE SLOT PREEMPTION" which claims priority to U.S. Provisional Patent Application No. 62/512,200 filed May 30, 2017 both of which are hereby incorporated by reference in their entirety.

TECHNICAL FIELD

The present disclosure relates, in general, to wireless communications and, more particularly, to code block aware slot transmission preemption.

INTRODUCTION

The Third Generation Partnership Project (3GPP) 5G New Radio (NR) communication system includes a time structure referred to as a mini-slot. A mini-slot is the smallest possible scheduling unit (smaller than a slot or a subframe).

In wireless communications, dynamic multiplexing of different services is highly desirable for efficient use of system resources and maximizing capacity. In downlink, the assignment of resources can be instantaneous and is only limited by the scheduler implementation. Once low-latency data appears in a buffer, a base station should choose the soonest moment of time when resources could be normally allocated. This may be either the beginning of a subframe or a mini-slot where the mini-slot can start at any orthogonal frequency division multiplexing (OFDM) symbol.

However, the stringent latency budget of such traffic as ultra-reliable low-latency communication (URLLC) may require transmission of a mini-slot signal without waiting for vacant resources. Thus, the user equipment (UE) may need to handle puncturing/preemption of slot data transmission such as, for example, in cases when slot transmissions to a first UE on already allocated resources were overridden by mini-slot transmission to a second UE. This may cause a negative impact in terms of mini-slot transmitter interference on slot receivers. Dynamic resource sharing between slot and mini-slot transmissions in the uplink is also desirable and may involve puncturing/preemption of a slot by mini-slot transmissions.

As used herein, the terms "puncturing" and "pre-emption" have the same meaning. Both terms may be used for description, but the 3GPP focus is moving toward the term "pre-emption."

FIG. 1 illustrates a general procedure for resource allocation and transmission. A buffer (block 1) collects packets of slot data and reports about data presence to Scheduler (block 7). Packets in the buffer (block 1) are waiting for a scheduling command which triggers channel coding, HARQ cyclic buffer forming, and modulation procedures (block 3). Scheduler (block 7) makes a decision about time-frequency ranges of modulated slot data and provides this information to block 5, which is responsible for forming a time-frequency grid which consist of modulation symbols. In practice, block 5 may aggregate inputs from more than one source and an upper limit is defined by various factors which are out of the scope of this disclosure.

In the process of forming the time-frequency grid, mini-slot data can arrive in the buffer (block 2). Because of strict latency requirements for mini-slot data, the Scheduler (block 7) may replace part of the slot modulation symbols by mini-slot modulation symbols. To do this, the Scheduler (block 7) triggers mini-slot channel coding etc. by sending a command to block 4. It also sends updated grid mapping information to block 5.

The prepared time-frequency grid is transferred to block 6 for OFDM modulation and further signal processing. A radio signal is transmitted by block 8 to the antenna.

The Scheduler (7) could be a logical part of a transmitting node (base station) or it could be located outside of transmitting node (user equipment). In a first case, signaling data between blocks is delivered internally inside a node. A second case utilizes external signaling links between scheduler and transmitting node.

HARQ retransmissions with incremental redundancy use a few different redundancy versions (RV) that are used for subsequent retransmissions. Typically, RV0 is used in the initial transmission that includes information bits and a number of parity bits. The following redundancy versions, which are used for the retransmissions, contain additional parity bits. If the code block has not been successfully decoded after retransmission with other available RVs, RV0 is typically retransmitted.

3GPP may specify sending a multi-bit HARQ feedback where each bit corresponds to an ACK/NACK for a code block group (CBG). The size of a CBG ranges from a single code block (CB) to the whole transport block (TB). A CBG may be part of mini-slot or slot data.

There currently exist certain challenges. For example, problem may be that when a slot transmission is punctured, the probability that partially punctured code blocks cannot be successfully decoded increases. If a large fraction of a slot's code block is punctured, the probability that the code block is successfully decoded is in principle zero and retransmissions of such code blocks are always needed.

When a mini-slot transmission is allocated to time-frequency resources used for different slot transmission CBGs, the probability that several slot transmission CBGs must be retransmitted increases. This in turn further reduces the slot transmission throughput.

SUMMARY

To address the foregoing problems with existing solutions, disclosed is systems and methods for code block aware slot transmission preemption.

According to certain embodiments, a method is provided for use in a wireless transmitter. The method includes receiving an indication to schedule a high-priority transmission to preempt a lower-priority transmission that comprises one or more code blocks. A first resource allocation is determined for the high-priority transmission. A fraction of bits in the one or more code blocks of the lower-priority transmission that will be punctured by the first resource allocation is determined. When the fraction of bits in the one or more code blocks of the lower-priority transmission that will be punctured is less than a threshold, the first resource allocation is used for the high-priority transmission. When the fraction of bits in the one or more code blocks of the lower-priority transmission that will be punctured is not less than the threshold, a second allocation for the high-priority transmission is determined and used to minimize a number of the one or more code blocks that will be punctured.

According to certain embodiments, a wireless transmitter includes processing circuitry configured to receive an indication to schedule a high-priority transmission to preempt a lower-priority transmission that comprises one or more code blocks. A first resource allocation is determined for the high-priority transmission. A fraction of bits in the one or more code blocks of the lower-priority transmission that will be punctured by the first resource allocation is determined. When the fraction of bits in the one or more code blocks of the lower-priority transmission that will be punctured is less than a threshold, the first resource allocation is used for the high-priority transmission. When the fraction of bits in the one or more code blocks of the lower-priority transmission that will be punctured is not less than the threshold, a second allocation for the high-priority transmission is determined and used to minimize a number of the one or more code blocks that will be punctured.

Certain embodiments of the present disclosure may provide one or more technical advantages. For example, certain embodiments may provide attempt to spread a mini-slot transmission over as many slot code blocks as possible, thereby increasing the probability that a code block that is partially punctured is successfully decoded. This reduces the number of slot retransmissions due to puncturing. Additionally, the transmission latency of the slot data is reduced.

Another technical advantage may be that, if successful decoding of punctured slot code blocks is unlikely, certain embodiments confine the puncturing of slot data to as few code blocks as possible. In this case, the number of code blocks, or code block groups, that must be retransmitted is reduced.

Other advantages may be readily apparent to one having skill in the art. Certain embodiments may have none, some, or all of the recited advantages.

BRIEF DESCRIPTION OF THE DRAWINGS

For a more complete understanding of the embodiments and their features and advantages, reference is now made to the following description, taken in conjunction with the accompanying drawings, in which.

DETAILED DESCRIPTION

The embodiments described herein consider possible allocations of mini-slot transmissions and compare the fraction of punctured symbols in each punctured slot transmission code block to a puncturing threshold. A goal is to determine if the mini-slot transmission should be spread over as many slot transmission code blocks as possible for given restrictions on mini-slot transmission latency and scheduling, or if the mini-slot transmission should be allocated to as few code blocks or code block groups as possible.

If the fraction of punctured symbols is lower than the threshold, the probability that each code block can be successfully decoded despite the puncturing is high and retransmissions may be avoided. On the other hand, if the fraction of punctured symbols is higher than the threshold for at least one slot transmission code block, it is likely that these code blocks cannot be decoded successfully and must be retransmitted. Different strategies for mini-slot transmission allocation with spreading or with allocation to as few code blocks as possible are also described.

The following description sets forth numerous specific details. It is understood, however, that embodiments may be practiced without these specific details. In other instances, well-known circuits, structures and techniques have not been shown in detail in order not to obscure the understanding of this description. Those of ordinary skill in the art, with the included descriptions, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments, whether or not explicitly described.

Particular embodiments are described with reference to FIGS. 2-12B of the drawings, like numerals being used for like and corresponding parts of the various drawings. LTE and NR are used throughout this disclosure as an example cellular system, but the ideas presented herein may apply to other wireless communication systems as well.

Figure 1:
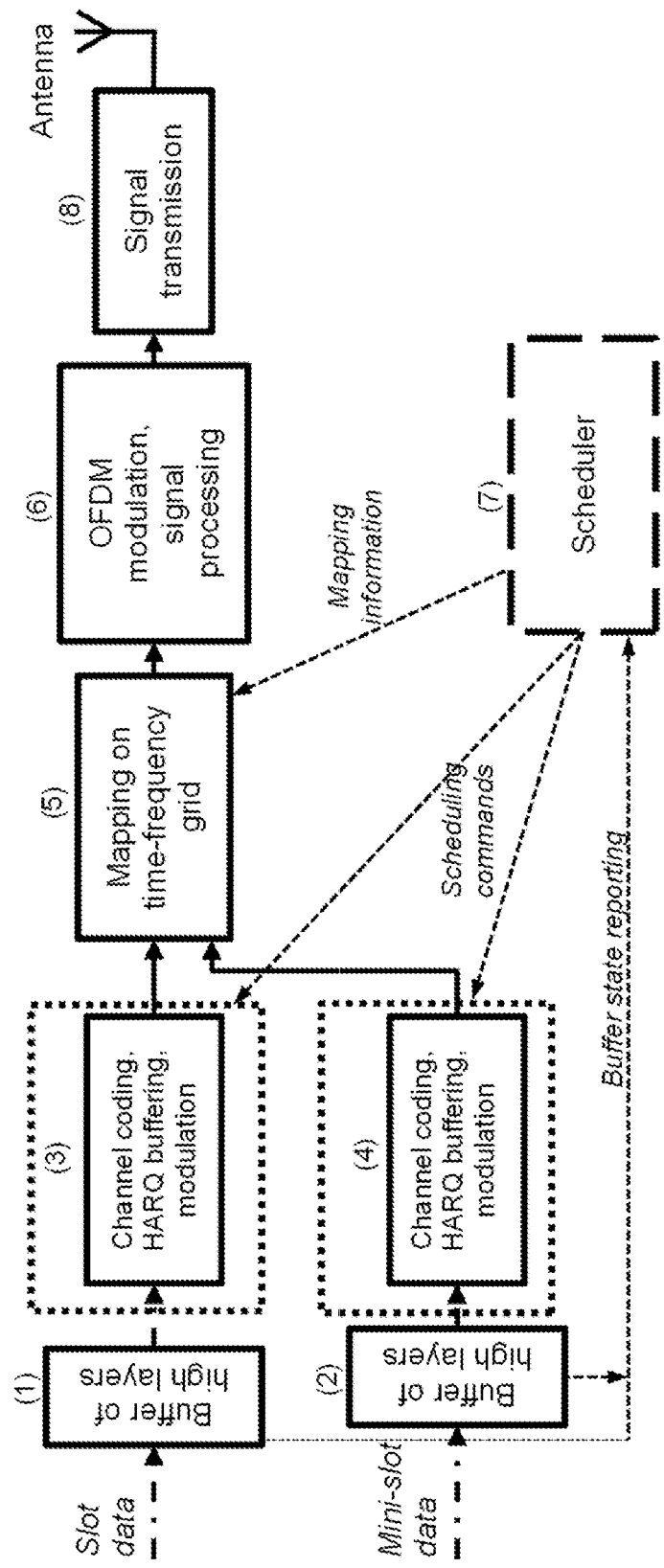
FIG. 1 illustrates a general procedure for resource allocation and transmission.
Figure 2:
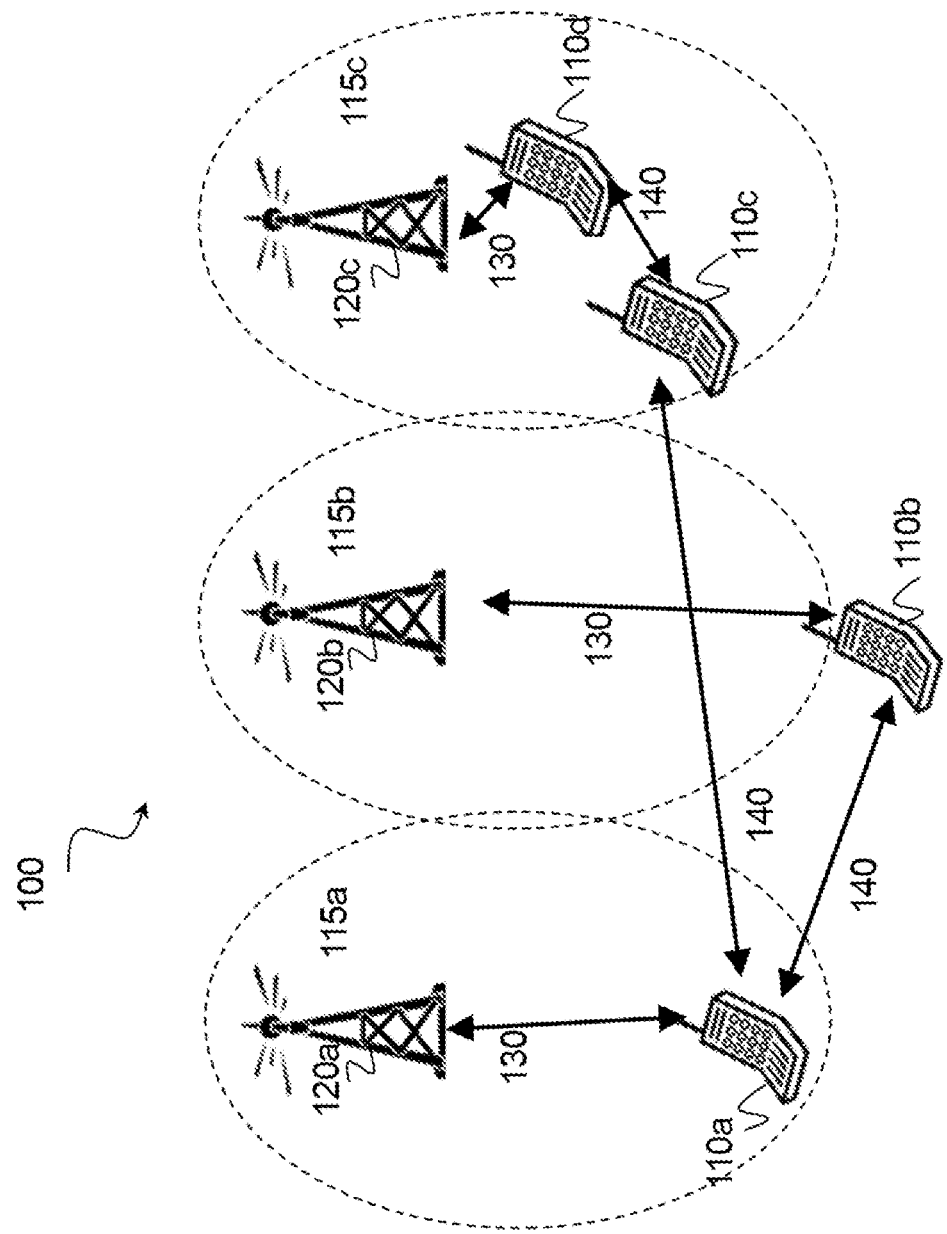
FIG. 2 is a block diagram illustrating an example wireless network, according to certain embodiments.
Figure 3:
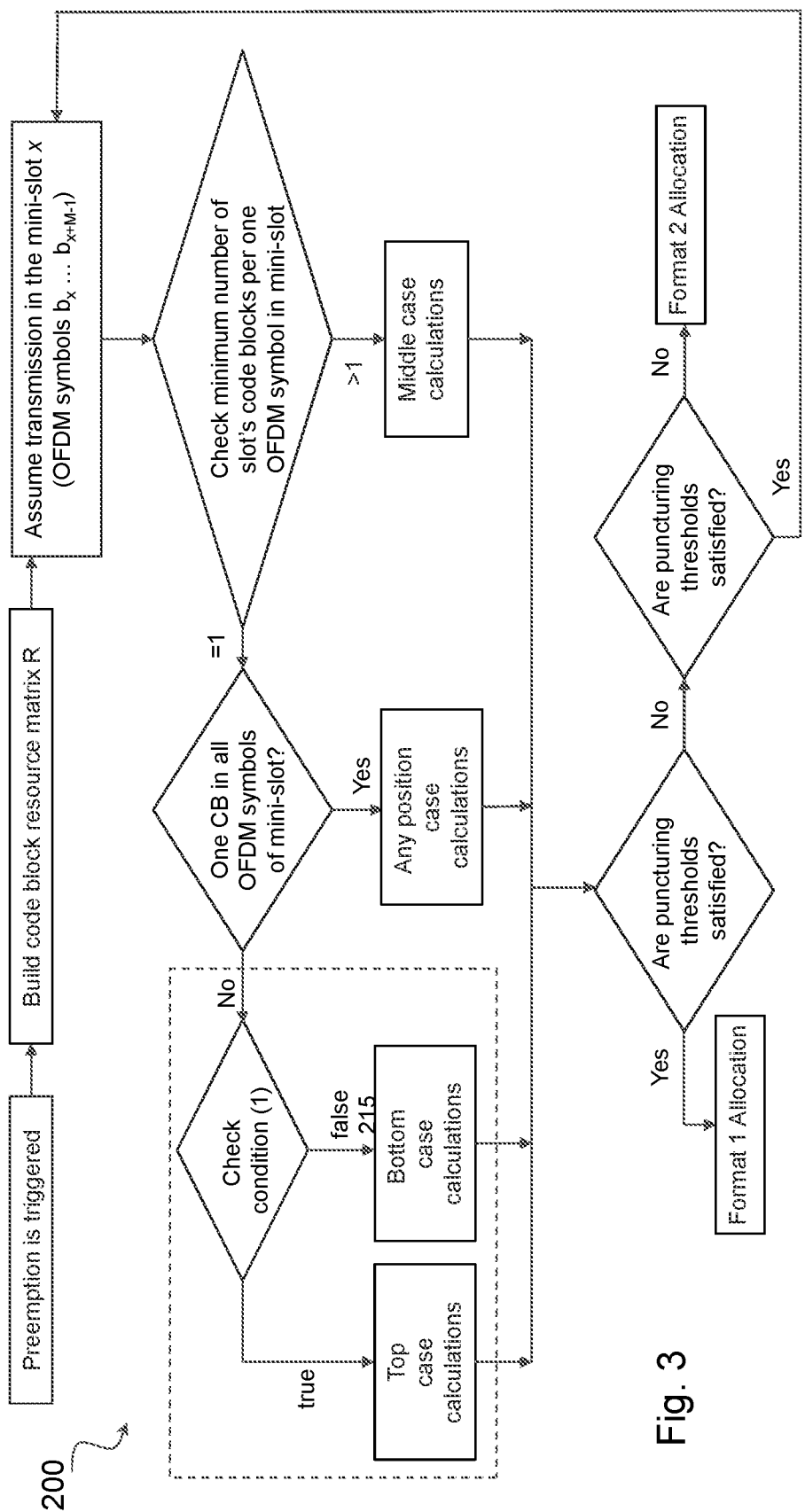
FIG. 3 is flow diagram illustrating an algorithm for allocating resources for mini-slot transmission, according to certain embodiments.

FIG. 2 is a block diagram illustrating an example wireless network 100, according to a particular embodiment. Wireless network 100 includes one or more wireless devices 110 (such as mobile phones, smart phones, laptop computers, tablet computers, MTC devices, V2X devices, or any other devices that can provide wireless communication) and a plurality of network nodes 120 (such as base stations or eNodeBs). Wireless device 110 may also be referred to as a UE. Network node 120 serves coverage area 115 (also referred to as cell 115).

In general, wireless devices 110 that are within coverage of network node 120 (e.g., within cell 115 served by network node 120) communicate with network node 120 by transmitting and receiving wireless signals 130. For example, wireless devices 110 and network node 120 may communicate wireless signals 130 containing voice traffic, data traffic, and/or control signals.

A network node 120 communicating voice traffic, data traffic, and/or control signals to wireless device 110 may be referred to as a serving network node 120 for the wireless device 110. Communication between wireless device 110 and network node 120 may be referred to as cellular communication. Wireless signals 130 may include both downlink transmissions (from network node 120 to wireless devices 110) and uplink transmissions (from wireless devices 110 to network node 120). In LTE, the interface for communicating wireless signals between network node 120 and wireless device 110 may be referred to as a Uu interface.

Each network node 120 may have a single transmitter or multiple transmitters for transmitting signals 130 to wireless devices 110. In some embodiments, network node 120 may comprise a multi-input multi-output (MIMO) system. Similarly, each wireless device 110 may have a single receiver or multiple receivers for receiving signals 130 from network nodes 120 or other wireless devices 110.

Wireless devices 110 may communicate with each other (i.e., D2D operation) by transmitting and receiving wireless signals 140. For example, wireless device 110a may communicate with wireless device 110b using wireless signal 140. Wireless signal 140 may also be referred to as sidelink 140. Communication between two wireless devices 110 may be referred to as D2D communication or sidelink communication. In LTE, the interface for communicating wireless signal 140 between wireless devices 110 may be referred to as a PC5 interface.

Wireless signals 130 and 140 may be transmitted on time-frequency resources. The time-frequency resources may be partitioned into radio frames, subframes, slots, and/or mini-slots. Data may be scheduled for transmission based on the partitions. For example, data transmissions may be scheduled based on subframe, slot, or mini-slot.

Wireless device 110, network node 120, or any other component of network 100 that transmits wireless signals may be referred to as a wireless transmitter. Wireless device 110, network node 120, or any other component of network 100 that receives wireless signals may be referred to as a wireless receiver.

In particular embodiments, scheduling of mini-slot transmissions takes a slot transmission performance into account when puncturing slot transmissions. For example, a wireless transmitter may determine a degree to which a potential allocation of mini-slot transmission resources will puncture symbols in a transmission code block and compares the determination with a puncturing threshold. If the fraction of punctured symbols is lower than the threshold, the probability that each code block can be successfully decoded despite the puncturing is high and retransmissions may be avoided. Thus, the wireless transmitter may spread the mini-slot allocation over as many slot transmission code blocks as possible for a given restriction on mini-slot transmission latency and scheduling.

On the other hand, if the fraction of punctured symbols is higher than the threshold for at least one slot transmission code block, it is likely that these code blocks cannot be decoded successfully and must be retransmitted. Thus, the wireless transmitter may allocate the mini-slot transmission to as few code blocks or code block groups as possible. In particular embodiments, the wireless transmitter may determine the mini-slot allocation according to any of the examples and embodiments described with respect to FIGS. 3-10.

In wireless network 100, each network node 120 may use any suitable radio access technology, such as long-term evolution (LTE), 5G NR, LTE-Advanced, UMTS, HSPA, GSM, cdma2000, NR, WiMax, WiFi, and/or other suitable radio access technology. Wireless network 100 may include any suitable combination of one or more radio access technologies. For purposes of example, various embodiments may be described within the context of certain radio access technologies. However, the scope of the disclosure is not limited to the examples and other embodiments could use different radio access technologies.

As described above, embodiments of a wireless network may include one or more wireless devices and one or more different types of radio network nodes capable of communicating with the wireless devices. The network may also include any additional elements suitable to support communication between wireless devices or between a wireless device and another communication device (such as a landline telephone). A wireless device may include any suitable combination of hardware and/or software. For example, in particular embodiments, a wireless device, such as wireless device 110, may include the components described with respect to FIG. 11A below. Similarly, a network node may include any suitable combination of hardware and/or software. For example, in particular embodiments, a network node, such as network node 120, may include the components described with respect to FIG. 12A below.

Particular embodiments include mapping mini-slot modulation symbols into the time-frequency grid when puncturing slot transmissions. An algorithm for scheduling a mini-slot transmission that punctures a slot transmission may reduce the need of slot retransmissions as well as reduce the average delay. The algorithm may not require any pre-defined agreements between transmission and reception node.

Particular examples assume that there are no vacant time-frequency resources in an ongoing subframe transmission and that there is at least one scheduled slot transmission because these conditions are obligatory for triggering slot preemption. Any vacant time-frequency resources may be scheduled first, but preemption is applied if there is remaining mini-slot data that must be transmitted instead of already scheduled slot data.

Particular embodiments may minimize the impact on the slot data that is punctured. Some embodiments provide co-existence of mini-slot and slot transmissions and may apply to gaming, streaming services, and other services that need very low latency but where reliability is not crucial. If reliability is important, the resources with the best channel may be selected without taking the slot transmission performance into account. Particular embodiments may be applied to various extents, depending on reliability requirements.

Particular examples assume that two types of data services are being carried: broadband and low-latency services. The same principle can be used by those skilled in the art to extend the procedures to other scenarios such as, for example, carrying three or more different data services or carrying services different from those mentioned above.

Particular embodiments estimate the punctured slot transmission performance for several different alternatives of mini-slot transmission allocation. The estimation is based on the fraction of each code block that is punctured and predefined puncturing thresholds that are calculated in advance for different code block sizes and code rates. Assuming that mini-slot transmissions are evenly distributed over the already assigned slot code blocks, the threshold may state how large a fraction of punctured slot data bits that can be allowed without significantly decreasing the probability that the code blocks are successfully decoded. If the fraction of puncturing in one or several slot's code blocks is above the puncturing threshold (i.e., successful decoding is unlikely), the mini-slot transmission allocation should be confined to as few slot's code blocks as possible to reduce the amount of resources needed for retransmission.

Particular embodiments may include the following general algorithm. In a first step, the transmitter determines a first resource allocation for a high-priority transmission that spreads puncturing over as many code blocks of a lower-priority transmission as possible. At a second step, the transmitter calculates the fraction of puncturing for the punctured code blocks. At a third step, the transmitter compares the puncturing fraction to a predefined puncturing threshold. If the puncturing fraction is less than the puncturing threshold, then the transmitter allocates resources to high-priority transmission as determined in the first step. Otherwise, the transmitter allocates resources to high-priority transmission such that the allocation is confined to as few code blocks of the lower-priority transmission as possible.

The predefined puncturing thresholds may depend on one or several of code rate, code block size, signal to noise ratio (SNR), specific parity-check matrix describing the low-density parity-check (LDPC) code, modulation order, block-error rate (BLER) target, and allowed BLER performance loss due to puncturing. The pre-defined thresholds may be collected in a lookup table for fast access. The predefined threshold may also be the end points of the fraction range (i.e., 0 or 1). This indicates that the system will always use spreading or isolation.

The probability of successful decoding of a punctured slot's code block is significantly increased if the exact region of punctured bits can be detected. The log-likelihood ratios for these bits can then be set to zero to inform the decoder that these bits carry no information about the actual transmitted code block. Particular embodiments apply both to the case where the punctured region is not known to the slot data receiver and to the case where the punctured region is known. The predefined puncturing thresholds should, however, have higher values if the punctured region is known, because more puncturing can be allowed without significant impact on the probability of successful decoding.

A particular example includes the case where a mini-slot transmission allocation covers a set of consecutive physical resource blocks (PRBs) and a set of consecutive OFDM symbols in the time-frequency grid. Particular embodiments consider several mini-slot transmission allocation hypotheses and select, if possible, a hypothesis for which it is likely that all slot's code blocks can be successfully decoded without retransmissions. The embodiment 300 described with respect to FIG. 3 selects one of two possible mini-slot transmission allocation strategies.

Figure 4:
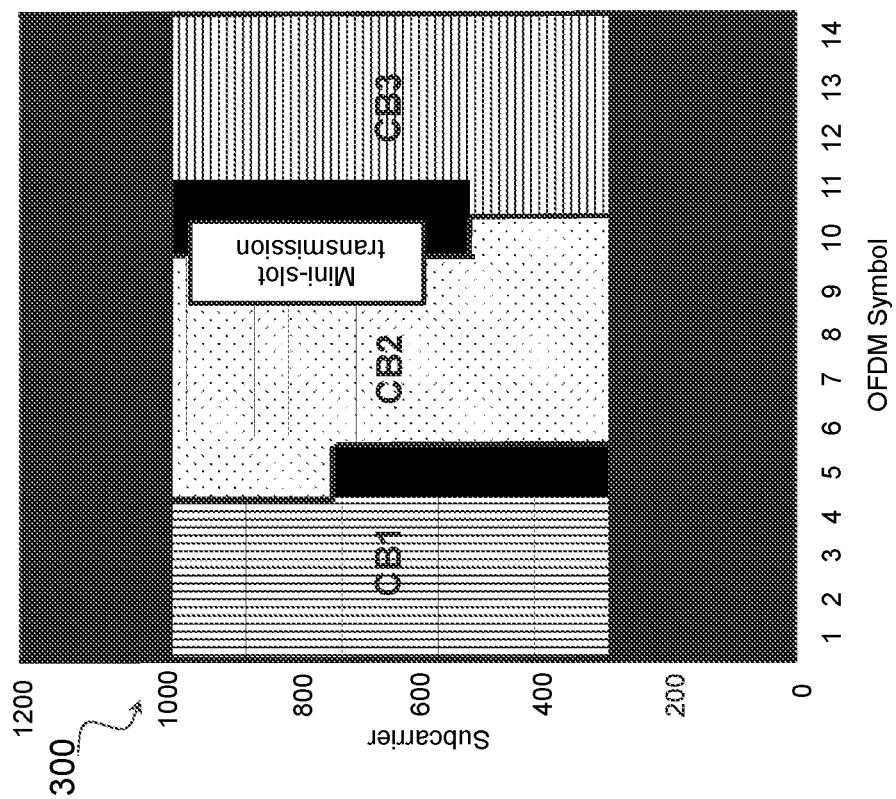
FIG. 4 is an example time-frequency grid illustrating a mini-slot transmission puncturing a slot in the time-frequency grid according to Format 1, according to certain embodiments.
Figure 7:
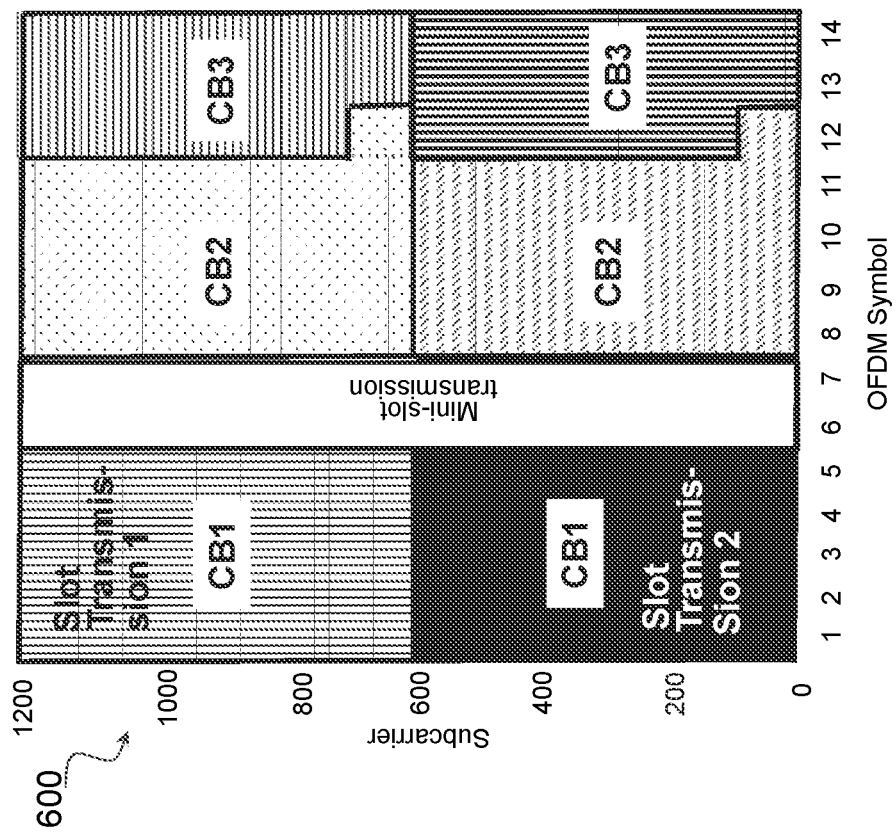
FIG. 7 is another example time-frequency grid illustrating a mini-slot transmission puncturing two slots in the time-frequency grid according to Format 1, according to certain embodiments.

The first allocation strategy determines that the fraction of punctured bits in all slot's code blocks is below the threshold and allocates the mini-slot transmission evenly spread over the already assigned slot's code blocks. An example 300 is illustrated in FIG. 4. This format may be referred to as Format 1.

Figure 5:
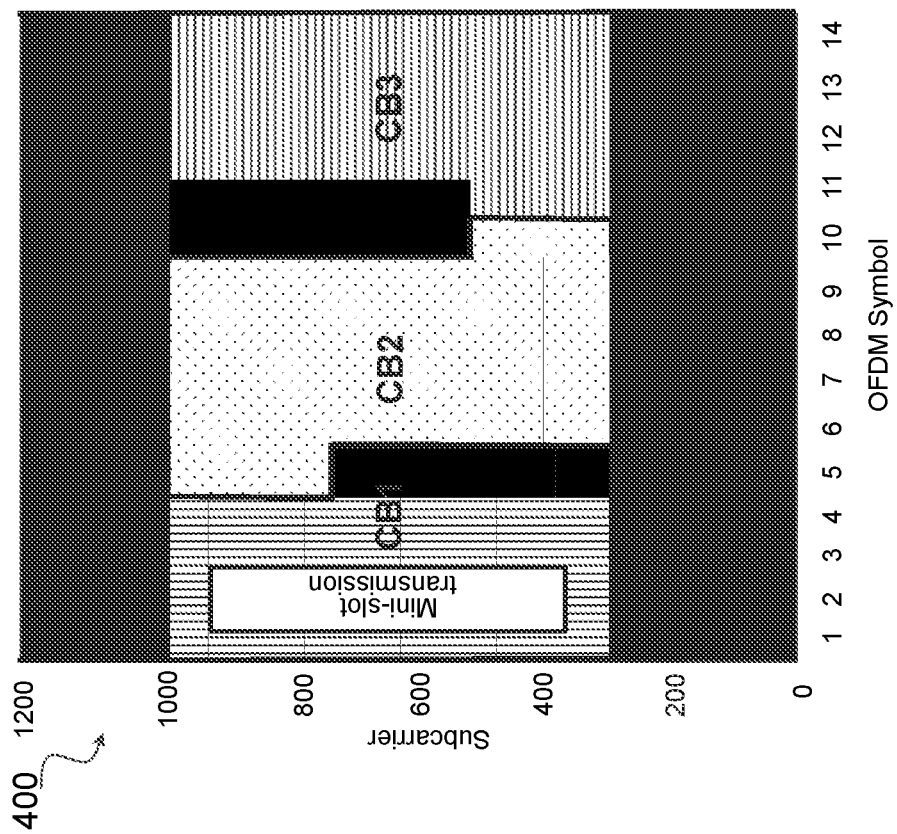
FIG. 5 is an example time-frequency grid illustrating a mini-slot transmission puncturing a slot in the time-frequency grid according to Format 2, according to certain embodiments.

The second allocation strategy determines that the fraction of punctured bits in all slot's code blocks is above the threshold and allocates the mini-slot transmission on as few slot's code blocks as possible, because the punctured slot's code blocks most likely will be retransmitted. An example 400 is illustrated in FIG. 5.

The description of particular embodiments may use the following notation:

E is a total number of neighboring slot allocations;
N is a number of OFDM symbols in slot transmission time interval (TTI);
M is a number of OFDM symbols in one mini-slot;
X is a number of mini-slots in TTI;
Ce is number of code blocks in slot allocation e, where $e \in [1 \ldots E]$; and
$C_{total} = \Sigma C_e$ is a total number of CBs in all neighboring slot allocations.

If there is more than one slot allocation and they are neighbors, the end-to-end code block numeration should be used in calculations. For example, for two slot allocations of three CBs each the numeration is 1-3 for CBs of first slot allocation and 4-6 for CBs of second slot allocation.

Particular embodiments include code block resource matrix R. For example, returning to FIG. 3, once preemption is triggered, the transmitter builds the code block resource matrix R for slot transmissions. The size of the matrix is $C_{total} \times N$. The matrix element $r_{i,j}$ denotes number of resource elements (REs) of code block number $i \in [1 \ldots C_{total}]$ in the OFDM symbol number $j \in [1 \ldots N]$. The example of the table R for the example shown in FIGS. 4 and 5 is presented below. Reference signals are eliminated from the example, but in a realistic scenario the sum of REs in each column could not be uniform.

$$R = \begin{pmatrix} 720 & 720 & 720 & 720 & 492 & 0 & 0 & 0 & 0 & 0 & 0 & 0 & 0 & 0 \\ 0 & 0 & 0 & 0 & 228 & 720 & 720 & 720 & 720 & 264 & 0 & 0 & 0 & 0 \\ 0 & 0 & 0 & 0 & 0 & 0 & 0 & 0 & 0 & 456 & 720 & 720 & 720 & 720 \end{pmatrix}$$

Positions and duration of mini-slots are defined by upper level system configuration. Assuming the allocation to mini-slot $x \in [1 \ldots X]$ a selection of corresponding columns of matrix R must be done for further analysis. The truncated matrix for mini-slot x may be referred to as $R^x$ which is a submatrix of R and is formed by selection of M columns. The truncated matrix $R^x$ for the example given in FIG. 4 is:

$$R^5 = \begin{pmatrix} 0 & 0 \\ 720 & 264 \\ 0 & 456 \end{pmatrix}$$

where 5 is the mini-slot number and M=2.

According to certain embodiments, a best suitable case for checking may be selected. There could be a lot of possible preemption positions if mini-slot transmission allocation size is less than slot allocation(s) size in frequency domain. For decreasing the algorithm computation complexity, only four hypotheses can be checked. Moreover, it is possible to do a pre-selection of hypothesis by checking a few conditions. The hypotheses may include the following:

- The 'Any position case': The preemption frequency position most likely does not affect the performance if only one code block is scheduled within the mini-slot as shown in FIG. 5. This case corresponds to Format 2, but in particular embodiments the puncturing thresholds should be checked if another mini-slot is available for preemption.
- The 'Top case' and 'Bottom case': Due to code block mapping rules, the task of Format 1 possibility checking may be simplified. There are two allocation cases which should be checked if there is only one slot connection available for preemption and there is more than one slot's code block in a mini-slot. In general, both cases could be checked simultaneously (dashed box in the block diagram) or only one case could be taken into account after pre-selection based on the condition (1). Suppose code blocks y and y+1 have a border within a mini-slot.

$$\frac{\sum_j R^x_{y,j}}{\sum_j R_{y,j}} > \frac{\sum_j R^x_{y+1,j}}{\sum_j R_{y+1,j}} \quad (1)$$

The condition helps to determine which of two code blocks should be punctured more. As an example, assume that a code block y+1 is very short and fully falls in a mini-slot while a code block y is much bigger and only 20% of REs falls in a mini-slot. In this case the condition will look like 0.2>1, which is false, and preemption could be done in the bottom of slot allocation (closer to lower frequency). FIG. 4 shows an example where the "top case" is the preferred. The condition will be $$\frac{984}{3372} > \frac{456}{3336}$$

or after division 0.292>0.137, which is true, and preemption should be allocated in the top of slot allocation.

The 'Middle case': If there are more than one neighboring slot allocations, for checking the possibility of Format 1 it is reasonable to distribute preemption between two connections (see example 500 in FIG. 6) or even between different code blocks of two connections (see example 600 in FIG. 7). The same idea could be kept if more than one code block of one slot connection can fit in one OFDM symbol.

After pre-selection of hypotheses, the calculation of puncturing rate may be done by forming the matrix R* which is recalculated R. The recalculation is done by a subtraction of mini-slot allocation resource elements numbers from elements of R which are corresponding to mini-slot per OFDM symbol basis. Elements of matrix R* must be greater than or equal to zero. Therefore, if subtraction may give negative value, the modified element of matrix (minuend) is set to zero, the subtrahend is decreased by initial value of minuend and subtraction shall be continued with next/previous non-zero element of the same column. Each hypothesis has its own calculation rules for R* as follows:

The 'Any position case': R* is formed by direct subtraction of mini-slot allocation resource elements numbers from elements of R which are corresponding to mini-slot because only elements of one row within a mini-slot are greater than zero. An example of matrix R* for FIG. 5 is shown below. Mini-slot allocation has 600 REs per OFDM symbol. Modified values are bold.

$$R^* = \begin{pmatrix} 720 & 120 & 120 & 720 & 492 & 0 & 0 & 0 & 0 & 0 & 0 & 0 & 0 & 0 \\ 0 & 0 & 0 & 0 & 228 & 720 & 720 & 720 & 720 & 264 & 0 & 0 & 0 & 0 \\ 0 & 0 & 0 & 0 & 0 & 0 & 0 & 0 & 0 & 456 & 720 & 720 & 720 & 720 \end{pmatrix}$$

The 'Top case': Start subtraction of mini-slot allocation resource elements numbers from elements of R of the highest row number and columns which are corresponding to mini-slot. Subtraction direction is from the bottom to the top of the matrix R. An example of matrix R* for FIG. 4 is shown below. The mini-slot allocation has 384 REs per OFDM symbol. Modified values are bold.

$$R^* = \begin{pmatrix} 720 & 720 & 720 & 720 & 492 & 0 & 0 & 0 & 0 & 0 & 0 & 0 & 0 & 0 \\ 0 & 0 & 0 & 0 & 228 & 720 & 720 & 720 & 336 & 264 & 0 & 0 & 0 & 0 \\ 0 & 0 & 0 & 0 & 0 & 0 & 0 & 0 & 0 & 72 & 720 & 720 & 720 & 720 \end{pmatrix}$$

The 'Bottom case': Start subtraction of mini-slot allocation resource elements numbers from elements of R of the lowest row number and columns which are corresponding to mini-slot. Subtraction direction is from the top to the bottom of the matrix R.

Figure 6:
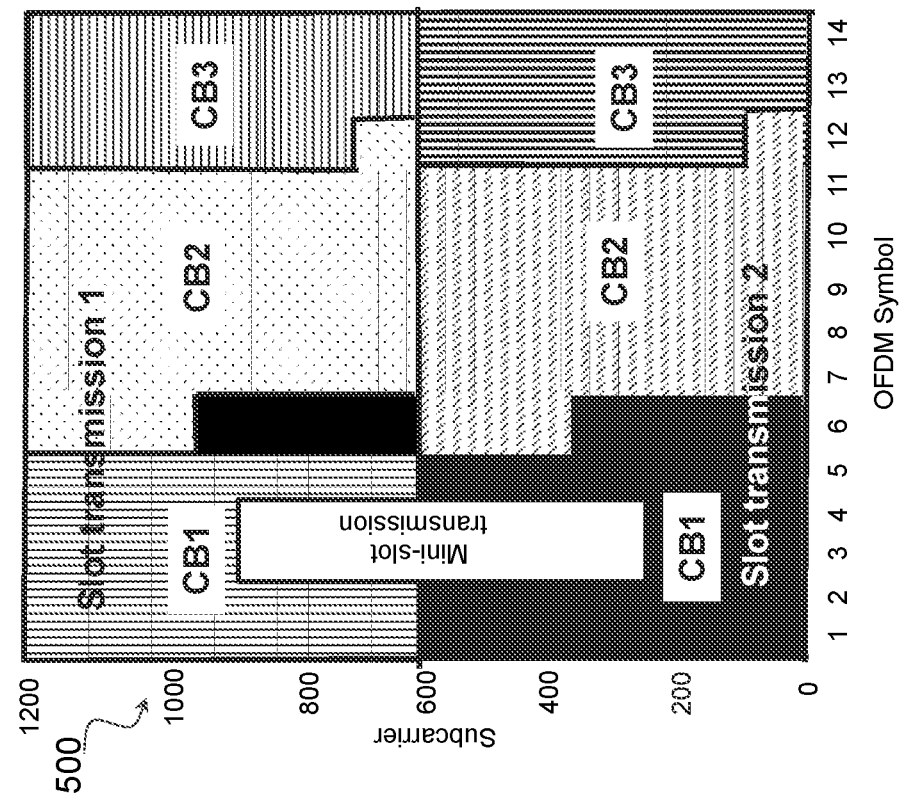
FIG. 6 is an example time-frequency grid illustrating a mini-slot transmission puncturing two slots in the time-frequency grid according to Format 1, according to certain embodiments.

The 'Middle case': Mini-slot allocation resource elements in each OFDM symbol should be split onto two pieces as much equally as possible. Then the subtraction for first slot transmission should be done according to "Top case" rules and the subtraction for second slot transmission should be done according to "Bottom case" rules. An example of matrix R and R* for FIG. 6 is shown below. The mini-slot allocation has 600 REs per OFDM symbol. Modified values are bold.

$$R = \begin{pmatrix} 600 & 600 & 600 & 600 & 600 & 384 & 0 & 0 & 0 & 0 & 0 & 0 & 0 & 0 \\ 0 & 0 & 0 & 0 & 0 & 216 & 600 & 600 & 600 & 600 & 600 & 168 & 0 & 0 \\ 0 & 0 & 0 & 0 & 0 & 0 & 0 & 0 & 0 & 0 & 0 & 432 & 600 & 600 \\ 600 & 600 & 600 & 600 & 600 & 384 & 0 & 0 & 0 & 0 & 0 & 0 & 0 & 0 \\ 0 & 0 & 0 & 0 & 0 & 216 & 600 & 600 & 600 & 600 & 600 & 168 & 0 & 0 \\ 0 & 0 & 0 & 0 & 0 & 0 & 0 & 0 & 0 & 0 & 0 & 432 & 600 & 600 \end{pmatrix}$$

And recalculation will be:

$$R^* = \begin{pmatrix} 600 & 600 & 300 & 300 & 600 & 384 & 0 & 0 & 0 & 0 & 0 & 0 & 0 & 0 \\ 0 & 0 & 0 & 0 & 0 & 216 & 600 & 600 & 600 & 600 & 600 & 168 & 0 & 0 \\ 0 & 0 & 0 & 0 & 0 & 0 & 0 & 0 & 0 & 0 & 0 & 432 & 600 & 600 \\ 600 & 600 & 300 & 300 & 600 & 384 & 0 & 0 & 0 & 0 & 0 & 0 & 0 & 0 \\ 0 & 0 & 0 & 0 & 0 & 216 & 600 & 600 & 600 & 600 & 600 & 168 & 0 & 0 \\ 0 & 0 & 0 & 0 & 0 & 0 & 0 & 0 & 0 & 0 & 0 & 432 & 600 & 600 \end{pmatrix}$$

After calculation of matrix R* the puncturing rate of code block $i \in [1 \ldots C_{total}]$ may be estimated by:

$$P(i) = 1 - \frac{\sum_j R^*_{i,j}}{\sum_j R_{i,j}} \quad (2)$$

Calculated puncturing rate values are then be compared to the pre-defined thresholds. If the puncturing rates for all code blocks are lower than the puncturing threshold, a transmission node can use allocation Format 1. Otherwise it should use allocation Format 2 or try to repeat the algorithm for the next mini-slot.

If the system has a freedom in mini-slot selection for puncturing, for checking the possibility of Format 1 allocation it is better to start from mini-slot which contains the maximum number of code blocks. Once puncturing thresholds are satisfied, mini-slot allocation should be done immediately.

If mini-slot is strictly defined by scheduler due to load or latency requirements, the algorithm may do an allocation decision after one iteration.

The Format 1 allocation should follow the logic of case calculations. Only resource elements of selected mini-slot could be replaced by mini-slot allocation resource elements. For simplification of mini-slot allocation procedure, the following rules can be applied:

The 'Any position case' and 'Bottom case': Replace time-frequency grid elements by mini-slot allocation resource elements starting from the minimal subcarrier number of slot allocations in each OFDM symbol of mini-slot.

The 'Top case': Replace time-frequency grid elements by mini-slot allocation resource elements pulling back from the maximal subcarrier number of slot allocations on the value of mini-slot allocation band size. In other words, allocate mini-slot transmission on the top subcarriers of slot allocation.

The 'Middle case': As described above, mini-slot allocation resource elements in each OFDM symbol should be split onto two pieces as much equally as possible. Then replacing time-frequency grid elements of the first slot transmission according to "Top case" rules by half of mini-slot allocation resource elements and elements of the second slot transmission according to the "Bottom case" rules.

For improving a quality of puncturing detection on the receiving node, a little space (e.g., 12 subcarriers) from slot allocation edge may be applied to mini-slot allocation for "Any position case", "Top case" and "Bottom case". In other words, mini-slot transmission can be shifted from the edge of slot allocation.

The Format 2 allocation should follow the opposite logic of case calculations. Only resource elements of selected mini-slot could be replaced by mini-slot transmission resource elements. For simplification of mini-slot transmission allocation procedure, the following rules can be applied:

The 'Any position case' and 'Top case': Replace time-frequency grid elements by mini-slot allocation resource elements starting from the minimal subcarrier number of slot allocations in each OFDM symbol of mini-slot.

The 'Bottom case': Replace time-frequency grid elements by mini-slot allocation resource elements pulling back from the maximal subcarrier number of slot allocations on the value of mini-slot allocation band size. In other words, allocate mini-slot transmission on the top subcarriers of slot allocation.

The 'Middle case': If mini-slot allocation fits into lesser slot allocation, replace time-frequency grid elements by mini-slot allocation resource elements starting from the minimal subcarrier number of this slot allocations in each OFDM symbol of mini-slot. Otherwise, if mini-slot allocation fits into bigger slot allocation do the same for that slot transmission. Otherwise, replace time-frequency grid elements of both slot transmissions starting from the minimal subcarrier number of the first slot transmission.

Particular embodiments may include extension to mini-slot aggregation. For example, some embodiments may be adapted to a scenario when a few mini-slots are aggregated to one scheduling unit. The adaptation can be achieved by minor changes of the algorithm such as extension of calculation unit from mini-slot to mini-slot group.

Particular embodiments may include extension to code block groups (GBGs). For example, some embodiments may be extended to usage with CBGs by allocating mini-slot transmission to resources in the time-frequency grid that are used by one single CBG of slot transmission, the number of resources needed for the retransmission is reduced. This may be important when using Format 2 if more than one code block is punctured, because it is known beforehand that the decoder will not be able to decode these code blocks correctly. If code blocks from different CBGs are punctured, all these CBGs must with high probability be retransmitted.

Particular embodiments include allocation of mini-slot transmission using spatial multiplexing. For example, when multiple multiple-input multiple-output (MIMO) layers are used to transmit PDSCH or PUSCH, two TBs may be transmitted in the same time/frequency resource and are separated in spatial domain. Specifically, for NR, if more than 5 layers are used in transmission, then NR uses 2 MIMO codewords per PDSCH/PUSCH assignment per UE. Here a MIMO codeword corresponds to a TB.

When two TBs are scheduled for transmission for a UE in the same time/frequency resource, the two TBs are associated with its own MCS among other scheduling information. Due to the individually provided MCS, the two TBs are likely to have different TB size, leading to different CB size, CB location, and CB grouping.

Thus, when considering slot transmission preemption, it needs to be taken into consideration that the preemption affects both TBs. Therefore, it is preferred that mini-slot resource allocation considers the CB and/or CBG situation of both TBs. That is, mini-slot resource allocation should consider CBs and/or CBGs of both TBs, not just from a single TB. From an algorithm point of view, it could be done by forming resource matrix R for each MIMO layer.

Particular embodiments include allocation of mini-slot preemption considering the priority of channels and signals. For example, mini-slot preemption allocation may consider that there are several types of channels and signals, each having different priorities.

As a particular example, the uplink channels and signals are listed below from high priority to low priority:
PRACH transmission;
PUCCH; Depending on the content (i.e., UCI) carried by PUCCH, the PUCCH can be further differentiated with following different types, from high priority to low priority:
HARQ-ACK and/or SR. Here both are listed since HARQ-ACK and SR are considered to have the same priority level;
CSI; it can be assumed that periodic CSI and aperiodic CSI have the same priority level;
PUSCH; Depending on if the PUSCH carries UCI or not, PUSCH can be further differentiated with following different types, from high priority to low priority:
PUSCH carrying UCI;
PUSCH carrying data only (i.e., no UCI);
SRS;

When determining the resource allocation of mini-slot transmission, it is preferred that the preemption affects lower priority channels and signals and avoids affecting higher priority channels and signals as much as possible.

Figure 8:
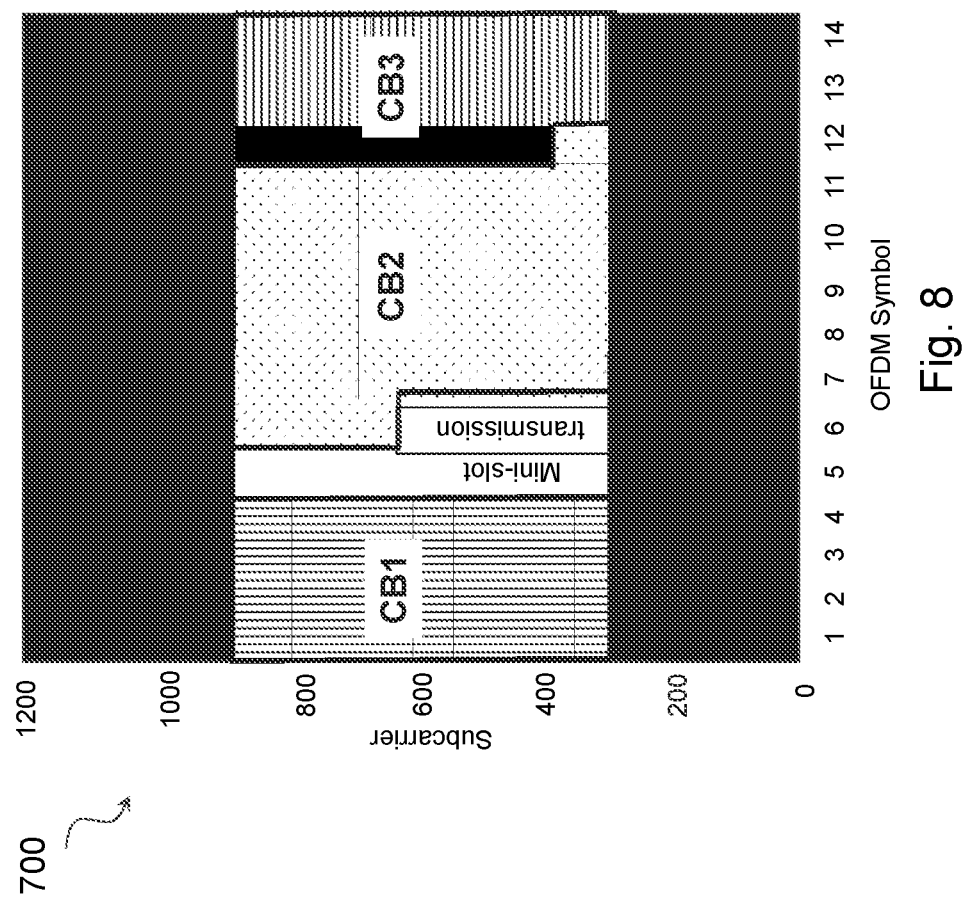
FIG. 8 is an example time-frequency grid illustrating a mini-slot transmission by replacing code block resource elements for intra-node puncturing, according to certain embodiments.

Particular embodiments may include intra-node preemption by CB/CBG replacement. For example, in intra-node pre-emption, where the slot data and mini-slot data are both sent by one transmitting node and received by a single receiving node, the pre-emption allocation may be done by replacing resource elements of one code block or code block group of slot transmission. The enabler for this is a knowledge of slot transmission CB/CBG borders in both transmission and reception nodes. Such allocation can be considered as Format 2 allocation. An example 700 is shown in FIG. 8, where puncturing starts from the end of CB1. In contrast with regular rectangular mini-slot puncturing allocation, direct replacement of slot CB's/CBG's resource elements may have non-rectangular form in the time-frequency grid. The approach is beneficial from the puncturing isolation point of view, because it has more freedom in the allocation of transmission within a mini-slot.

Particular embodiments include preemption and frequency diversity. For example, interleaving in different forms may be applied to increase the frequency or time diversity. If a transmission is interleaved in frequency and/or time, a mini-slot transmission allocation on consecutive REs may anyhow be spread over a number of different slot's code blocks. In the case where spreading is desired this may improve the performance, especially in the case when interleaving is performed within a time-frequency block that contains a large number (i.e., >2 or 4) of code blocks.

To achieve spreading of pre-emption within a large number of code blocks, suitable interleaving may be standardized. If interleaving is performed, the actual mini-slot transmission allocation within the interleaved region has no impact on the spreading. However, if interleaving is performed, for example, within each OFDM symbol, additional spreading may be achieved by allocating mini-slot transmission in two OFDM symbols. If isolation is desired, this becomes very difficult to achieve if interleaving is performed over a time-frequency region which contains several code blocks.

Another variant that achieves both mini-slot transmission frequency diversity and spreading is to allocate mini-slot transmission with spaces between REs within a specified time-frequency region. For example, mini-slot transmission can be allocated to every tenth subcarrier in the whole frequency region allocated for slot transmission. The periodicity must in this case be signaled through the mini-slot signaling link, for example, transmitted in the beginning of the mini-slot.

Particular embodiments may include intra-node grant free preemption. For example, the examples above may be extended to grant free intra-node puncturing. If a transmission node already has granted slot physical resources, the preemption for mini-slot transmission can be done without procedure of resources requesting/granting. This is mostly beneficial in uplink, but it can be applicable in downlink also. A decision about grant free intra-node preemption can be done internally by transmission node. Signaling or detection mechanisms may make the receiving node aware of this type of transmission.

Figure 9:
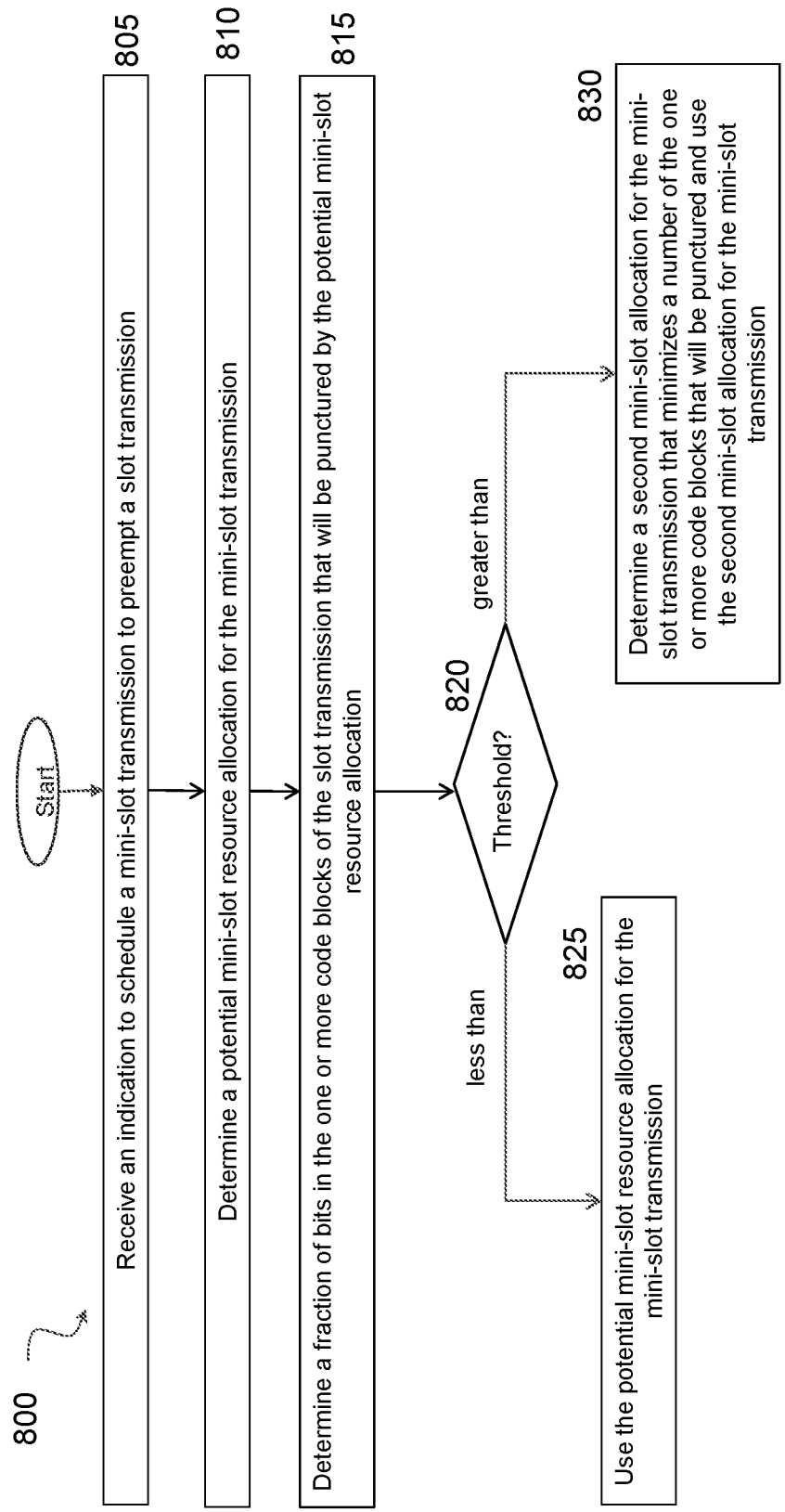
FIG. 9 is a flow diagram illustrating an example method for high-priority transmission, according to certain embodiments.

The examples and embodiments described above may be generalized by the flowchart in FIG. 9. FIG. 9 is flow diagram illustrating an example algorithm 800 for mini-slot transmission, according to some embodiments. In particular embodiments, one or more steps of FIG. 9 may be performed by network elements (e.g., network node 120, wireless device 110, etc.) of network 100 described with respect to FIG. 2.

The method begins at step 805, where the wireless transmitter receives an indication to schedule a mini-slot transmission to preempt a slot transmission. For example, after scheduling a slot transmission, network node 120 may determine that it needs to schedule a mini-slot transmission using some of the resources for the previously scheduled slot transmission.

At step 810, the wireless transmitter determines a potential mini-slot resource allocation for the mini-slot transmission. For example, network node 120 may determine a mini-slot allocation according to any of the examples given above (e.g., "top case", "bottom case", "middle case", "any position case", etc.).

At step 815, the wireless transmitter determines a fraction of bits in the one or more code blocks of the slot transmission that will be punctured by the potential mini-slot resource allocation. For example, network node 120 may determine the fraction of bits by building the resource matrices R and R* according to any of the embodiments and examples described above.

At step 820, the wireless transmitter compares the determined fraction to a threshold. When the fraction of bits in the one or more code blocks of the slot transmission that will be punctured is less than the threshold, the method continues to step 825 and the wireless transmitter uses the potential mini-slot resource allocation for the mini-slot transmission. For example, network node 120 may use the resources determined for the potential mini-slot allocation for transmitting the mini-slot.

Conversely, when it is determined that the fraction of bits in the one or more code blocks of the slot transmission that will be punctured is not less than the threshold (i.e., is greater than the threshold, the method continues to step 830, and the wireless transmitter determines a second mini-slot allocation for the mini-slot transmission that minimizes a number of the one or more code blocks that will be punctured and uses the second mini-slot allocation for the mini-slot transmission. For example, network node 120 may determine the second mini-slot allocation according to any of the embodiments and examples described above.

Modifications, additions, or omissions may be made to method of FIG. 9. Additionally, one or more steps in the method of FIG. 9 may be performed in parallel or in any suitable order. The steps may be repeated over time as necessary.

Figure 10:
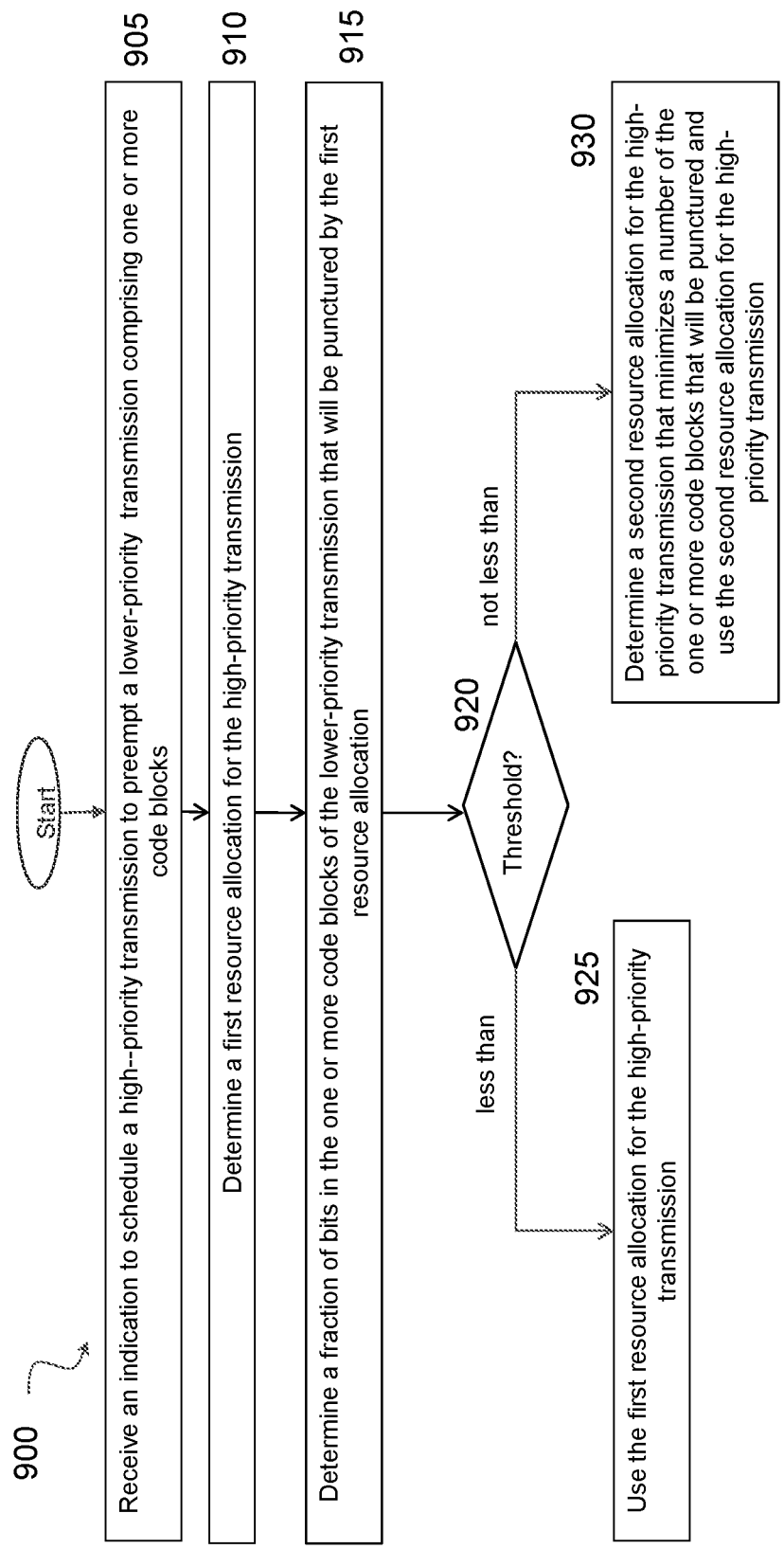
FIG. 10 is flow diagram illustrating an example method for mini-slot transmission, according to certain embodiments.

FIG. 10 is flow diagram illustrating another example algorithm 900 for mini-slot transmission, according to some embodiments. In particular embodiments, one or more steps of FIG. 9 may be performed by network elements (e.g., network node 120, wireless device 110, etc.) of network 100 described with respect to FIG. 2.

The method begins at step 905, where the wireless transmitter receives an indication to schedule a high-priority transmission to preempt a lower-priority transmission. The lower-priority transmission includes one or more code blocks. For example, after scheduling the lower-priority transmission, network node 120 may determine that it needs to schedule a high-priority transmission using some of the resources for the previously scheduled lower-priority transmission. In a particular embodiment, the lower-priority transmission may be selected from a plurality of transmissions, and the lower-priority transmission may be a lowest priority signal of the plurality of transmissions.

At step 910, the wireless transmitter determines a first resource allocation for the high-priority transmission. In various particular embodiments, for example, network node 120 may determine the first resource allocation according to any of the examples given above (e.g., "top case", "bottom case", "middle case", "any position case", etc.).

According to certain embodiments, for example, the lower-priority transmission may include a plurality of code blocks and the first resource allocation for the high-priority transmission may be spread over at least two code blocks within the plurality of code blocks of the lower-priority transmission. In a particular embodiment, the at least two code blocks may be within a single code block group. Additionally, the first resource allocation may spread puncturing over all of the code blocks within one code block group. In another particular embodiment, the first resource allocation may be spread evenly over the plurality of code blocks of the lower-priority transmission.

At step 915, the wireless transmitter determines a fraction of bits in the one or more code blocks of the lower-priority transmission that will be punctured by the first resource allocation. For example, network node 120 may determine the fraction of bits by building the resource matrices R and R* according to any of the embodiments and examples described above.

At step 920, the wireless transmitter compares the determined fraction to a threshold. In a particular embodiment, the threshold may be dependent on least one capability of a lower-priority receiver. For example, the at least one capability may include an ability to receive a pre-emption indication, an ability to blindly detect pre-emption, and/or an ability to set pre-empted bits LLR to zero. In a particular embodiment, the threshold may be zero to minimize pre-emption of the at least one code block of the lower-priority transmission.

When it is determined at step 920 that the fraction of bits in the one or more code blocks of the lower-priority transmission that will be punctured is less than the threshold, the method continues to step 925 and the wireless transmitter uses the first resource allocation for the higher-priority transmission. For example, network node 120 may use the resources determined for the first resource allocation for transmitting the high-priority transmission.

In a particular embodiment, at least one resource element of the lower-priority transmission may be replaced with at least one resource element associated with the high-priority transmission. Where, for example, the lower-priority transmission and the high-priority transmission are scheduled for transmission from the wireless transmitter to a single wireless receiver, a code block or code block group of the lower-priority transmission may be replaced with a code block or code block group of the high-priority transmission. More specifically, in one example, embodiment, the replaced at least one resource element of the lower-priority transmission may include a plurality of resource elements in a plurality of orthogonal frequency division multiplexing symbols. In another example embodiment, the replaced at least one resource element of the lower-priority transmission may include a plurality of resource elements that are separated from each other within a time-frequency region.

Conversely, when it is determined at step 920 that the fraction of bits in the one or more code blocks of the lower-priority transmission that will be punctured is not less than the threshold, the method continues to step 930, and the wireless transmitter determines a second resource allocation for the high-priority transmission that minimizes a number of the one or more code blocks that will be punctured and uses the second resource allocation for the high-priority transmission. For example, network node 120 may determine the second resource allocation according to any of the embodiments and examples described above.

In a particular embodiment, determining the second resource allocation for the high-priority transmission may include selecting the second resource allocation from a plurality of possible resource allocations based on a determination that the fraction of bits in the one or more code blocks of the first slot transmission that will be punctured is not less than a threshold. Additionally, the plurality of possible resource allocations comprises at least one of a first possible resource allocation for the high-priority transmission that replaces at least one resource element of the lower-priority transmission with at least one resource element of the high-priority transmission starting from a minimal subcarrier number of a plurality of subcarriers of the lower-priority transmission and a second possible resource allocation for the high-priority transmission that replaces at least one resource element of the lower-priority transmission with at least one resource element of the high-priority transmission pulling back from a maximal subcarrier number of a plurality of slot allocations on a value of a high-priority allocation band size.

According to certain embodiments, the high-priority transmission may also preempt an additional lower-priority transmission that also includes one or more code blocks. In such a scenario, the fraction of bits in the one or more code blocks of the additional lower-priority transmission that will be punctured by the first resource allocation may also be determined. The first resource allocation may be used for the high-priority transmission when both the fraction of bits in the one or more code blocks of the lower-priority transmission that will be punctured is less than the threshold and the fraction of bits in the one or more code blocks of the additional lower-priority transmission that will be punctured is less than the threshold. Conversely, the second resource allocation may be used for the high-priority transmission when the fraction of bits in the one or more code blocks of the lower-priority transmission that will be punctured is not less than the threshold or the fraction of bits in the one or more code blocks of the additional lower-priority transmission that will be punctured is not less than the threshold.

In a particular embodiment, the lower-priority transmission includes a plurality of common code blocks, the additional lower-priority transmission comprises the same plurality of code blocks, and the first resource allocation for the high-priority transmission is spread over at least two code blocks within the plurality of code blocks of the lower-priority transmission and the additional lower-priority transmission.

In a particular embodiment, the lower-priority transmission may be associated with a first MIMO layer and the additional lower-priority transmission may be associated with a second MIMO layer.

In a particular embodiment, the first resource allocation may be selected from a plurality of possible resource allocations based on a determination that the fraction of bits in the one or more code blocks of the lower-priority transmission that will be punctured is less than the threshold for the first resource allocation. For example, the plurality of possible resource allocations may include a first possible resource allocation for the high-priority transmission starting from a minimal subcarrier number of a plurality of subcarriers of the lower-priority transmission. Additionally, or alternatively, the plurality of possible resource allocations may include a second possible resource allocation for the high-priority transmission pulling back from a maximal subcarrier number of a plurality of subcarriers of the lower-priority transmission on a value of a high-priority allocation band size.

Modifications, additions, or omissions may be made to method of FIG. 10. Additionally, one or more steps in the method of FIG. 10 may be performed in parallel or in any suitable order. The steps may be repeated over time as necessary.

Figure 11B:
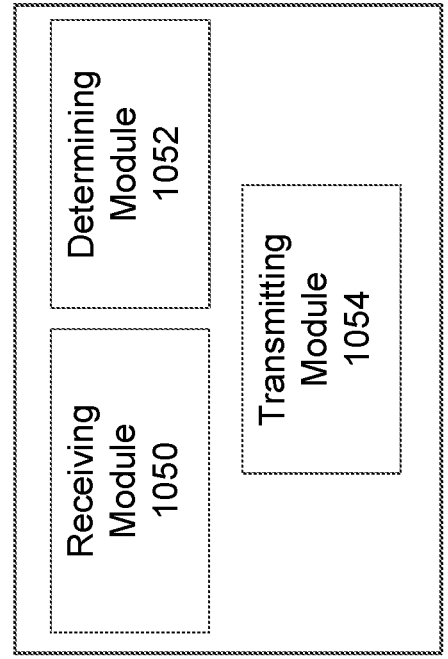
FIG. 11B is a block diagram illustrating example components of a wireless device, according to certain embodiments.
Figure 11A:
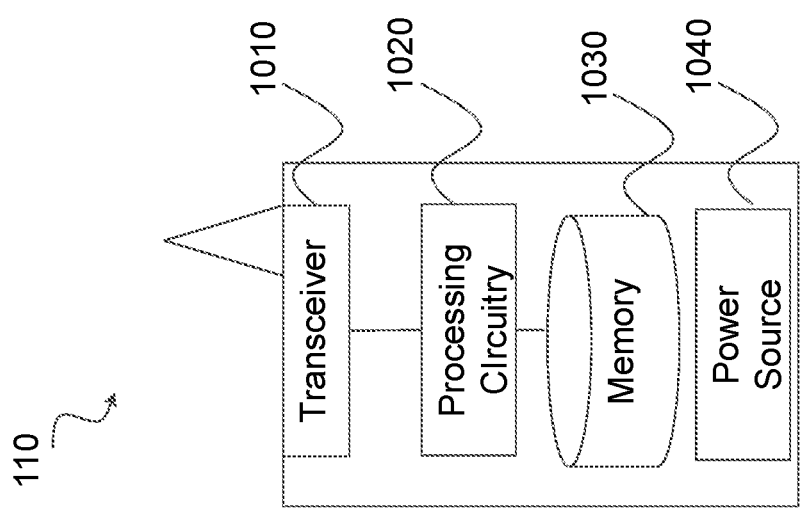
FIG. 11A is a block diagram illustrating an example embodiment of a wireless device, according to some embodiments.

FIG. 11A is a block diagram illustrating an example embodiment of a wireless device. The wireless device is an example of the wireless devices 110 illustrated in FIG. 2. In particular embodiments, the wireless device is capable of preempting a lower-priority transmission with a high-priority transmission while reducing the chances for retransmission of a preempted code block. In a particular embodiment, the lower-priority transmission may be a slot transmission and the high-priority transmission may be a mii-slot transmission.

Particular examples of a wireless device include a mobile phone, a smart phone, a PDA (Personal Digital Assistant), a portable computer (e.g., laptop, tablet), a sensor, a modem, a machine type (MTC) device/machine to machine (M2M) device, laptop embedded equipment (LEE), laptop mounted equipment (LME), USB dongles, a device-to-device capable device, a vehicle-to-vehicle device, or any other device that can provide wireless communication. The wireless device includes transceiver 1010, processing circuitry 1020, memory 1030, and power source 1040. In some embodiments, transceiver 1010 facilitates transmitting wireless signals to and receiving wireless signals from wireless network node 120 (e.g., via an antenna), processing circuitry 1020 executes instructions to provide some or all of the functionality described herein as provided by the wireless device, and memory 1030 stores the instructions executed by processing circuitry 1020. Power source 1040 supplies electrical power to one or more of the components of wireless device 110, such as transceiver 1010, processing circuitry 1020, and/or memory 1030.

Processing circuitry 1020 includes any suitable combination of hardware and software implemented in one or more integrated circuits or modules to execute instructions and manipulate data to perform some or all of the described functions of the wireless device. In some embodiments, processing circuitry 1020 may include, for example, one or more computers, one more programmable logic devices, one or more central processing units (CPUs), one or more microprocessors, one or more applications, and/or other logic, and/or any suitable combination of the preceding. Processing circuitry 1020 may include analog and/or digital circuitry configured to perform some or all of the described functions of wireless device 110. For example, processing circuitry 1020 may include resistors, capacitors, inductors, transistors, diodes, and/or any other suitable circuit components.

Memory 1030 is generally operable to store computer executable code and data. Examples of memory 1030 include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or or any other volatile or non-volatile, non-transitory computer-readable and/or computer-executable memory devices that store information.

Power source 1040 is generally operable to supply electrical power to the components of wireless device 110. Power source 1040 may include any suitable type of battery, such as lithium-ion, lithium-air, lithium polymer, nickel cadmium, nickel metal hydride, or any other suitable type of battery for supplying power to a wireless device.

Other embodiments of the wireless device may include additional components (beyond those shown in FIG. 11A) responsible for providing certain aspects of the wireless device's functionality, including any of the functionality described above and/or any additional functionality (including any functionality necessary to support the solution described above).

FIG. 11B is a block diagram illustrating example components of a wireless device 110. The components may include receiving module 1050, determining module 1052, and transmitting module 1054.

Receiving module 1050 may perform the receiving functions of wireless device 110. For example, receiving module 1050 may receive an indication to preempt a lower-priority transmission with a high-priority transmission according to any of the examples and embodiments described above. As described above, in a particular embodiment, the lower-priority transmission may include a slot transmission and the high-priority transmission may include a mini-slot transmission. In certain embodiments, receiving module 1050 may include or be included in processing circuitry 1020. In particular embodiments, receiving module 1050 may communicate with determining module 1052 and transmitting module 1054.

Determining module 1052 may perform the determining functions of wireless device 110. For example, determining module 1052 may determine a first resource allocation for the high-priority transmission, may determine a fraction of bits in the one or more code blocks of the lower-priority transmission that will be punctured by the first resource allocation, and may determine a second resource allocation for the high-priority transmission that minimizes a number of the one or more code blocks that will be punctured according to any of the examples and embodiments described above. As another example, determining module 1052 may determine a potential mini-slot resource allocation for the mini-slot transmission, may determine a fraction of bits in the one or more code blocks of the slot transmission that will be punctured by the potential mini-slot resource allocation, and may determine a second mini-slot allocation for the mini-slot transmission that minimizes a number of the one or more code blocks that will be punctured according to any of the examples and embodiments described above. In certain embodiments, determining module 1052 may include or be included in processing circuitry 1020. In particular embodiments, determining module 1052 may communicate with receiving module 1050 and transmitting module 1054.

Transmitting module 1054 may perform the transmitting functions of wireless device 110. For example, transmitting module 1054 may transmit a high-priority transmission according to any of the examples and embodiments described above. In certain embodiments, transmitting module 1054 may include or be included in processing circuitry 1020. In particular embodiments, transmitting module 1054 may communicate with receiving module 1050 and determining module 1052.

Figure 12B:
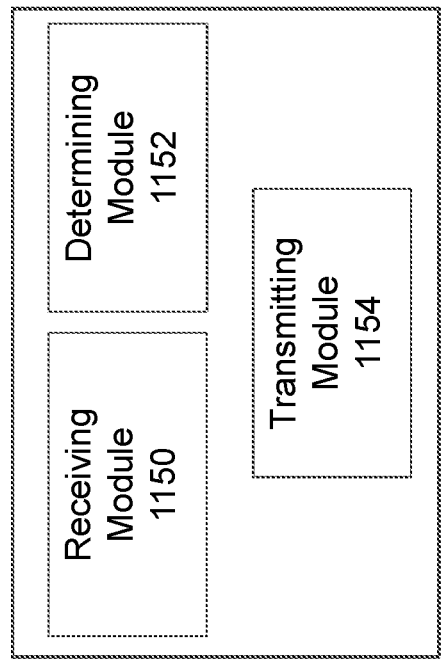
FIG. 12B is a block diagram illustrating example components of a network node, according to certain embodiments.
Figure 12A:
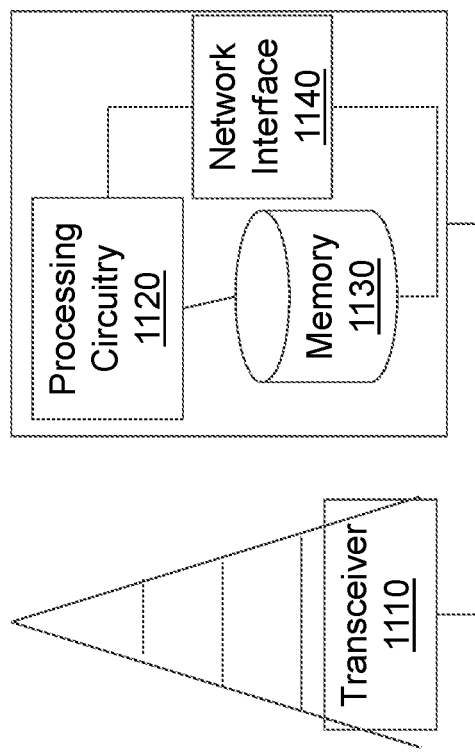
FIG. 12A is a block diagram illustrating an example embodiment of a network node, according to certain embodiments.

FIG. 12A is a block diagram illustrating an example embodiment of a network node. The network node is an example of the network node 120 illustrated in FIG. 2. In particular embodiments, the network node is capable of preempting a lower-priority transmission with a high-priority transmission while reducing the chances for retransmission of a preempted code block. In a particular embodiment, the lower-priority transmission may include a slot transmission and the high-priority transmission may include a mini-slot transmission.

Network node 120 can be an eNodeB, a nodeB, a base station, a wireless access point (e.g., a Wi-Fi access point), a low power node, a base transceiver station (BTS), a transmission point or node, a remote RF unit (RRU), a remote radio head (RRH), or other radio access node. The network node includes at least one transceiver 1110, at least one processing circuitry 1120, at least one memory 1130, and at least one network interface 1140. Transceiver 1110 facilitates transmitting wireless signals to and receiving wireless signals from a wireless device, such as wireless devices 110 (e.g., via an antenna); processing circuitry 1120 executes instructions to provide some or all of the functionality described above as being provided by a network node 120; memory 1130 stores the instructions executed by processing circuitry 1120; and network interface 1140 communicates signals to backend network components, such as a gateway, switch, router, Internet, Public Switched Telephone Network (PSTN), controller, and/or other network nodes 120. Processing circuitry 1120 and memory 1130 can be of the same types as described with respect to processing circuitry 1020 and memory 1030 of FIG. 11A above.

In some embodiments, network interface 1140 is communicatively coupled to processing circuitry 1120 and refers to any suitable device operable to receive input for network node 120, send output from network node 120, perform suitable processing of the input or output or both, communicate to other devices, or any combination of the preceding. Network interface 1140 includes appropriate hardware (e.g., port, modem, network interface card, etc.) and software, including protocol conversion and data processing capabilities, to communicate through a network.

Other embodiments of network node 120 include additional components (beyond those shown in FIG. 12A) responsible for providing certain aspects of the network node's functionality, including any of the functionality described above and/or any additional functionality (including any functionality necessary to support the solution described above). The various different types of network nodes may include components having the same physical hardware but configured (e.g., via programming) to support different radio access technologies, or may represent partly or entirely different physical components.

FIG. 12B is a block diagram illustrating example components of network node 120. The components may include receiving module 1150, determining module 1152, and transmitting module 1154.

Receiving module 1150 may perform the receiving functions of network node 120. For example, receiving module 1150 may receive an indication to preempt a high-priority transmission with a lower-priority transmission according to any of the examples and embodiments described above. In certain embodiments, receiving module 1150 may include or be included in processing circuitry 1120. In particular embodiments, receiving module 1150 may communicate with determining module 1152 and transmitting module 1154.

Determining module 1152 may perform the determining functions of network node 120. For example, determining module 1152 may determine a first resource allocation for the high-priority transmission, may determine a fraction of bits in the one or more code blocks of the lower-priority transmission that will be punctured by the first resource allocation, and may determine a second resource allocation for the high-priority transmission that minimizes a number of the one or more code blocks that will be punctured according to any of the examples and embodiments described above. In certain embodiments, determining module 1152 may include or be included in processing circuitry 1120. In particular embodiments, determining module 1152 may communicate with receiving module 1150 and transmitting module 1154.

Transmitting module 1154 may perform the transmitting functions of network node 120. For example, transmitting module 1154 may transmit a high-priority transmission according to any of the examples and embodiments described above. In certain embodiments, transmitting module 1154 may include or be included in processing circuitry 1120. In particular embodiments, transmitting module 1154 may communicate with receiving module 1150 and determining module 1152.

Modifications, additions, or omissions may be made to the systems and apparatuses disclosed herein without departing from the scope of the invention. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods disclosed herein without departing from the scope of the invention. The methods may include more, fewer, or other steps. Additionally, steps may be performed in any suitable order.

The following provides non-limiting examples of how certain aspects of the proposed solutions could be implemented. The examples are merely intended to illustrate how certain aspects of the proposed solutions could be implemented, however, the proposed solutions could also be implemented in other suitable manners. Examples include:

A method for use in a wireless transmitter, the method comprising:
  receiving an indication to schedule a mini-slot transmission to preempt a slot transmission, the slot transmission comprising one or more code blocks;
  determining a potential mini-slot resource allocation for the mini-slot transmission;
  determining a fraction of bits in the one or more code blocks of the slot transmission that will be punctured by the potential mini-slot resource allocation;
  when the fraction of bits in the one or more code blocks of the slot transmission that will be punctured is less than a threshold, using the potential mini-slot resource allocation for the mini-slot transmission; and
  when the fraction of bits in the one or more code blocks of the slot transmission that will be punctured is not less than the threshold, determining a second mini-slot allocation for the mini-slot transmission that minimizes a number of the one or more code blocks that will be punctured and using the second mini-slot allocation for the mini-slot transmission;
  optionally, determining the potential mini-slot resource allocation for the mini-slot transmission may comprise determining a mini-slot resource allocation that spreads puncturing over the greatest number of the one or more code blocks;
  optionally, determining the potential mini-slot resource allocation for the mini-slot transmission may comprise determining that the potential mini-slot resource allocation may puncture at least two code blocks of the one more code blocks; and
  optionally, the method may include determining the mini-slot resource allocation that punctures the code block of the at least two blocks with the least amount of resources in the mini-slot;
  optionally, determining the potential mini-slot resource allocation for the mini-slot transmission may include determining a mini-slot resource allocation that preempts the lowest priority signal;
  optionally, the method may further include setting log-likelihood ratios for the punctured bits to zero;
  optionally, the wireless transmitter comprises processing circuitry operable to perform the method above.
  optionally, the wireless transmitter may comprise a network node; and
  optionally, the wireless transmitter may comprise a user equipment.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the claims below.

Abbreviations used in the preceding description include:
3GPP Third Generation Partnership Project
BTS Base Transceiver Station
CB Code Block
CBG Code Block Group
D2D Device to Device
eNB eNodeB
FDD Frequency Division Duplex
LDPC Low-Density Parity-Check
LLR Log Likelihood Ratio
LTE Long Term Evolution
MAC Medium Access Control
M2M Machine to Machine
MIMO Multi-Input Multi-Output
MTC Machine Type Communication
NR New Radio
OFDM Orthogonal Frequency Division Multiplexing
PDSCH Physical Downlink Shared Channel
PUCCH Physical Uplink Control Channel
RAN Radio Access Network
RAT Radio Access Technology
RBS Radio Base Station
RNC Radio Network Controller
RRC Radio Resource Control
RRH Remote Radio Head
RRU Remote Radio Unit
RV Redundancy Version
SC Successive Cancellation
SCL Successive Cancellation List
SIB System Information Block
SNR Signal-to-Interference-plus-Noise Ratio
SSB Synchronization Signal Block
TDD Time Division Duplex
UE User Equipment
UL Uplink
URLLC Ultra-Reliable Low-Latency Communication
UTRAN Universal Terrestrial Radio Access Network
WAN Wireless Access Network

The invention claimed is:

1. A method for use in a wireless transmitter, the method comprising:
  receiving an indication to schedule a high-priority transmission to preempt a lower-priority transmission, the lower-priority transmission comprising one or more code blocks;
  determining a first resource allocation for the high-priority transmission;
  determining a fraction of bits in the one or more code blocks of the lower-priority transmission that will be punctured by the first resource allocation;
  when the fraction of bits in the one or more code blocks of the lower-priority transmission that will be punctured is less than a threshold, using the first resource allocation for the high-priority transmission; and when the fraction of bits in the one or more code blocks of the lower-priority transmission that will be punctured is not less than the threshold, determining a second allocation for the high-priority transmission that minimizes a number of the one or more code blocks that will be punctured and using the second allocation for high-priority transmission.

2. The method of claim 1, wherein the wireless transmitter comprises a network node.

3. The method of claim 1, wherein the wireless transmitter comprises a user equipment.

4. A wireless transmitter comprising:
processing circuitry configured to:
receive an indication to schedule a high-priority transmission to preempt a lower-priority transmission, the lower-priority transmission comprising one or more code blocks;
determine a first resource allocation for the high-priority transmission;
determine a fraction of bits in the one or more code blocks of the lower-priority transmission that will be punctured by the high-priority resource allocation;
when the fraction of bits in the one or more code blocks of the lower-priority transmission that will be punctured is less than a threshold, use the first resource allocation for the high-priority transmission; and
when the fraction of bits in the one or more code blocks of the lower-priority transmission that will be punctured is not less than the threshold, determine a second allocation for the high-priority transmission that minimizes a number of the one or more code blocks that will be punctured and using the second allocation for high-priority transmission.

5. The wireless transmitter of claim 4, wherein:
the lower-priority transmission comprises a plurality of code blocks, and
the first resource allocation for the high-priority transmission is spread over at least two code blocks within the plurality of code blocks of the lower-priority transmission.

6. The wireless transmitter of claim 5, wherein the at least two code blocks over which the first resource allocation is spread are within one code block group.

7. The wireless transmitter of claim 5 wherein the first resource allocation is spread evenly over the plurality of code blocks of the lower-priority transmission.

8. The wireless transmitter of claim 4, wherein determining the first resource allocation for the high-priority transmission comprises determining the first resource allocation that spreads puncturing over all of the code blocks within one code block group.

9. The wireless transmitter of claim 4, wherein the processing circuitry is configured to select the lower-priority transmission from a plurality of transmissions, the lower-priority transmission being a lowest priority signal of the plurality of transmissions.

10. The wireless transmitter of claim 4, wherein the threshold is dependent on least one capability of a lower-priority receiver, the at least one capability comprising one or more of:
an ability to receive a pre-emption indication,
an ability to blindly detect pre-emption, and
an ability to set pre-empted bits LLR to zero.

11. The wireless transmitter of claim 4 wherein the threshold is zero to minimize the number of the one or more code block of the lower-priority transmission that will be punctured.

12. The wireless transmitter of claim 4, wherein the high-priority transmission also preempts an additional lower-priority transmission, the additional lower-priority transmission comprising one or more code blocks, and the processing circuitry is further configured to:
determine a fraction of bits in the one or more code blocks of the additional lower-priority transmission that will be punctured by the first resource allocation;
use the first resource allocation for the high-priority transmission when:
the fraction of bits in the one or more code blocks of the lower-priority transmission that will be punctured is less than the threshold, and
the fraction of bits in the one or more code blocks of the additional lower-priority transmission that will be punctured is less than the threshold; and
use the second resource allocation for the high-priority transmission when:
the fraction of bits in the one or more code blocks of the lower-priority transmission that will be punctured is not less than the threshold, or
the fraction of bits in the one or more code blocks of the additional lower-priority transmission that will be punctured is not less than the threshold.

13. The wireless transmitter of claim 12, wherein:
the lower-priority transmission comprises a first plurality of code blocks,
the additional lower-priority transmission comprises second plurality of code blocks, and
the first resource allocation for the high-priority transmission is spread over at least two code blocks within the first plurality of code blocks of the lower-priority transmission and the second plurality of code blocks of the additional lower-priority transmission.

14. The wireless transmitter of claim 12, wherein the lower-priority transmission is associated with a first MIMO layer and the additional lower-priority transmission is associated with a second MIMO layer.

15. The wireless transmitter of claim 4, wherein the processing circuitry is configured to replace at least one resource element of the lower-priority transmission with at least one resource element associated with the high-priority transmission.

16. The wireless transmitter of claim 15, wherein:
the lower-priority transmission and the high-priority transmission are scheduled for transmission from the wireless transmitter to a single wireless receiver, and
replacing the at least one resource element of the lower-priority transmission comprises replacing a code block or code block group of the lower-priority transmission with a code block or code block group of the high-priority transmission.

17. The wireless transmitter of claim 16, wherein the replaced at least one resource element of the lower-priority transmission comprises a plurality of resource elements in a plurality of orthogonal frequency division multiplexing symbols.

18. The wireless transmitter of claim 16, wherein the replaced at least one resource element of the lower-priority transmission comprises a plurality of resource elements within a time-frequency region.

19. The wireless transmitter of claim 4, wherein determining the first resource allocation for the high-priority transmission comprises:
selecting the first resource allocation from a plurality of possible resource allocations based on a determination that the fraction of bits in the one or more code blocks of the lower-priority transmission that will be punctured is less than the threshold for the first resource allocation.

20. The wireless transmitter of claim 19, wherein:
the plurality of possible resource allocations comprises at least one of:
a first possible resource allocation for the high-priority transmission starting from a minimal subcarrier number of a plurality of subcarriers of the lower-priority transmission; and
a second possible resource allocation for the high-priority transmission including a subcarrier with a maximal subcarrier number of a plurality of subcarriers of the lower-priority transmission on a value of a high-priority allocation band size.

21. The wireless transmitter of claim 4, wherein determining the second resource allocation for the high-priority transmission comprises:
selecting the second resource allocation from a plurality of possible resource allocations based on a determination that the fraction of bits in the one or more code blocks of the lower-priority transmission that will be punctured is not less than a threshold for the first resource allocation.

22. The wireless transmitter of claim 21, wherein the plurality of possible resource allocations comprises at least one of:
a first possible resource allocation for the high-priority transmission that replaces at least one resource element of the lower-priority transmission with at least one resource element of the high-priority transmission starting from a minimal subcarrier number of a plurality of subcarriers of the lower-priority transmission; and
a second possible resource allocation for the high-priority transmission that replaces at least one resource element of the lower-priority transmission with at least one resource element of the high-priority transmission including a subcarrier with a maximal subcarrier number of a plurality of subcarriers on a value of a high-priority allocation band size.

23. The wireless transmitter of claim 4, wherein the wireless transmitter comprises a network node.

24. The wireless transmitter of claim 4, wherein the wireless transmitter comprises a user equipment.

* * * * *